US008826362B1

(12) United States Patent
Kulakowski

(10) Patent No.: US 8,826,362 B1
(45) Date of Patent: Sep. 2, 2014

(54) ENHANCED CABLECARD PROCESSOR INCLUDING OOB SIMULATOR

(75) Inventor: Robert Kulakowski, Rancho Santa Fe, CA (US)

(73) Assignee: Verimatrix, Inc., San Diego, CA (US)

( * ) Notice: Subject to any disclaimer, the term of this patent is extended or adjusted under 35 U.S.C. 154(b) by 294 days.

(21) Appl. No.: 12/721,380

(22) Filed: Mar. 10, 2010

Related U.S. Application Data

(60) Provisional application No. 61/159,795, filed on Mar. 12, 2009.

(51) Int. Cl.
*H04N 7/16* (2011.01)

(52) U.S. Cl.
USPC .............. 725/136; 725/31; 725/68; 725/109; 725/110; 725/111; 725/138; 725/139; 725/140; 725/141; 725/142; 709/217; 709/218; 709/219

(58) Field of Classification Search
None
See application file for complete search history.

(56) References Cited

U.S. PATENT DOCUMENTS

| 6,757,909 | B1* | 6/2004 | Maruo et al. ................... 725/111 |
| 2005/0073610 | A1* | 4/2005 | Akiyama et al. .............. 348/705 |
| 2008/0320529 | A1* | 12/2008 | Louchkoff et al. ............. 725/68 |

* cited by examiner

*Primary Examiner* — Joshua Taylor
(74) *Attorney, Agent, or Firm* — KPPB LLP

(57) ABSTRACT

An enhanced cable card device is described that operates in host devices without requiring an out-of-band data channel. One embodiment includes a broadcast receiver for receiving a broadcast signal, a processor for coordinating processing in the cable card, a memory for storing data normally received by the cable card over an out-of-band signal, an in band data receiver for receiving an in band data signal, and a control program running on the processor to signal reception of an out-of-band signal to a host device electrically connected to the cable card. In addition, the control program processes data from the memory and provides processed output data to the host device simulating data normally received over an out-of-band data channel, and the cable card allows the host device to operate normally without an out-of-band receiver.

6 Claims, 2 Drawing Sheets

Please Select Network

☐ COX – San Diego

☐ Time Warner – San Diego

☐ COX – Atlanta

*Fig. 2*

ENHANCED CABLECARD PROCESSOR INCLUDING OOB SIMULATOR

RELATED APPLICATIONS

This application claims priority to U.S. Provisional Patent Application No. 61/159,795 filed Mar. 12, 2009, the disclosure of which is incorporated herein by reference.

FIELD OF THE INVENTION

The invention relates generally to cable cards and more specifically to the receipt of out-of-band data by cable cards.

BACKGROUND

A Cable Card (CC) is a plug-in card that allows consumers to view and record digital cable televisions channels on digital video recorders, personal computers, and televisions without the use of other equipment such as a set top box (STB) provided by a cable television company. The card, which is typically provided by a subscriber's local cable company is typically a PCMCIA card.

CCs may be used to access both standard definition and high definition channels. The card acts like a unique "key" to unlock the channels and services to which the cable customer has subscribed.

In the United States, there are two kinds of physical CCs: single stream CCs (S-CARD), which are able to decode a single channel at a time; and multi-stream CCs (M-CARD), which can decode up to six channels simultaneously. CCs are covered in the United States by standards including SCTE 28, SCTE 41, CEA-679, the disclosure of which is hereby incorporated by reference in its entirety.

SUMMARY OF THE INVENTION

CCs in accordance with embodiments of the invention spoof the host device into thinking the cable card is processing OOB data. One embodiment includes a broadcast receiver for receiving a broadcast signal, a processor for coordinating processing in the cable card, a memory for storing data normally received by the cable card over an out-of-band signal, an in band data receiver for receiving an in band data signal; and a control program running on the processor to signal reception of an out-of-band signal to a host device electrically connected to the cable card. In addition, the control program processes data from the memory and provides processed output data to a host device simulating data normally received over an out-of-band data channel, and the cable card allows a host device to operate normally without an out-of-band receiver.

In a further embodiment, at least some of the data normally received by the cable card over an out-of-band signal is received from the in band data signal. In another embodiment, at least some of the data normally received by the cable card over an out-of-band signal is stored in non-volatile memory on the cable card.

BRIEF DESCRIPTION OF DRAWINGS

FIG. 2 conceptually illustrates a screen of a user interface enabling a user to select a specific cable network.

DETAILED DESCRIPTION

Figure 1:
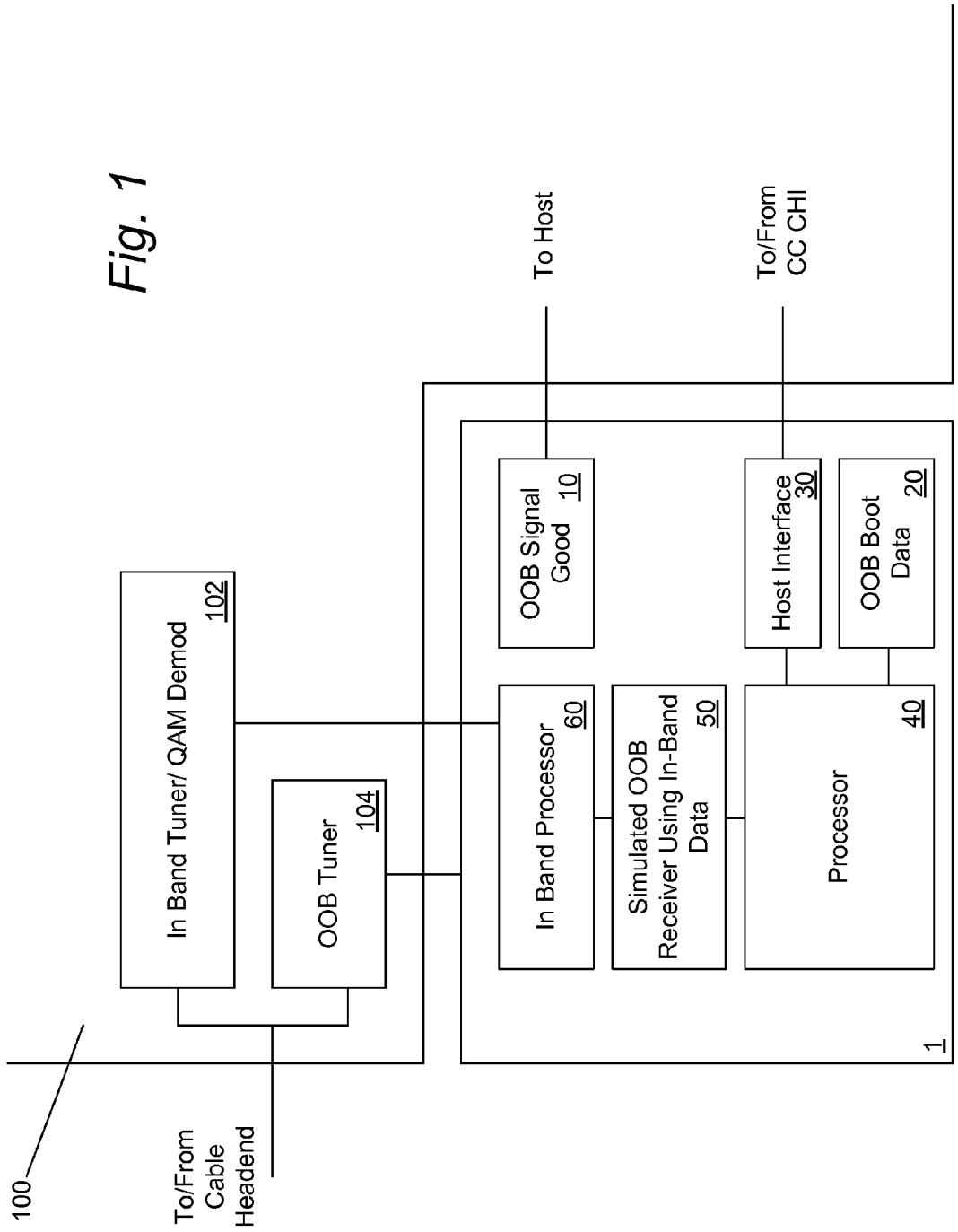
FIG. 1 is a block diagram illustrating the interface of a cable card containing Conditional Access System and System Information data with a device including a cable card slot in accordance with an embodiment of the invention.

Turning now to the drawings, Cable Cards (CC) that obtain the Conditional Access System (CAS) and System Information (SI) data normally sent over the CC Out-Of-Band (OOB) data channel by pre-storing part or all of the data and/or obtaining the data via the in band signal in accordance with embodiments of the invention are shown. In many embodiments, the CC does not need an OOB tuner and OOB Forward Data Channel (FDC) demodulator. The CC receives data normally sent over the OOB channel using the Forward Application Transport (FAT) channel in the RF signals transmitted from a cable head-end through the cable broadcasting network, and from pre-stored data in the CC. The CC then uses a CC OOB data channel simulator to interface to the host and spoof the host device into thinking the cable card is processing OOB data. OOB CAS, OOB SI data, and other data is referred to as OOB_CC_DATA. Data stored in flash memory in the CC (or sent over the network using any technique aside from the OOB channel) eliminates the need for an OOB data channel normally expected in a CC deployment to boot the CC. Once booted the CC optionally receives updated CC data normally sent over the OOB_CC_DATA channel from the IN_BAND_DATA_CHANNEL once again eliminating the need for an OOB data channel.

In several embodiments, support for multiple networks is included allowing a hosting system operator to distribute one cable card to a number of smaller operators and the single cable card contains a plurality of system configuration data normally sent OOB, with small operator unique configuration data being available for each operator. A GUI running on the host device can be used to select a network configuration or MPEG data sent in the broadcast stream can indicate to the CC the network the CC is connected with allowing the CC to correctly boot on the network without an OOB channel. When the GUI method is used, the CC uses the host device's display capability to prompt a user to select the network they are connecting with. An example GUI is shown in FIG. 2. Alternatively, the CC can be configured by the operator for the correct network the CC will connect with such as COX-San Diego and then the user will not be prompted to select a network. Yet another alternative is to send data over the network that selects the network parameters that should be used for the connected network and this can be done in a number of ways including over the FAT channel, in a video stream, using MPEG2-TS packets containing the network identifier or using private data in a video stream or control message, or any other technique.

CCs in accordance with embodiments of the invention spoof the host device into thinking the cable card is processing OOB data and using signals to the host that the CC is receiving the OOB signal. Normally, the host device requires the CC to signal correct reception of an OOB signal to the host so that the host will boot the CC and accept data from the CC. CCs in accordance with embodiments of the invention can spoof the host by providing appropriate signaling to the host that the OOB data channel is being received and by sending data normally received on the OOB data channel to the host using either prestored data in the CC or data received over the in band signal.

Examples of OOB data stored in the CC or received over the in band signal include any one or more of the following data:

a. Conditional Access System (CAS)
b. System Information (SI)/PSIP
c. Electronic Program Guide (EPG)
d. System Time Table (STT)
e. Master Guide Table (MGT)
f. Virtual Channel Table (VCT)
g. Network Information Table (NIT)
h. Rating Region Table (RTT)
i. Event Information Table (EIT)
j. Extended Text Table (ETT)
k. Directed Channel Change Table (DCCT)
l. XAIT data
m. OCAP/MHP/GEM or other data
n. Application data associated with other applications running on the host or CC or both
o. Other data used in cable or broadcast system
p. Other data of any type In the event the flashed stored spoofed OOB data does not allow the host device to detect the IN_BAND_DATA_CHANNEL the CC can include a hunt algorithm to configure the host to search different frequencies for the in band data channel. Normally, the card will contain the correct default settings to find the in band data channel and this hunt algorithm will not be necessary. This is because the host device can receive TV signals without a CC installed and the CC is necessary only for encrypted channels.

SI data of any type (including CAS specific data) is delivered via an IN_BAND_DATA_CHANNEL. SI data delivered over the IN_BAND_DATA_CHANNEL contains data normally sent over the OOB channel. The IN_BAND_DATA_CHANNEL is contained within the audio/video signal that contains the programs a viewer is watching.

The OOB_CC_DATA is stored in flash and available to the CC at first power on. The OOB_CC_DATA can be optionally updated remotely in the field so that subsequent power-ons provide updated CC data to the CC for processing on the next power-on.

FIG. 1 provides a unified view of the functional blocks contained with a host device 100, such as a TV set, with a cable card 1 inserted into the host in accordance with an embodiment of the invention. In the illustrated embodiment, the host device 100 includes an in band tuner and/or QAM demodulator 102 and/or an OOB tuner 104 and interfaces for exchanging signals with a CC (typically a PCMCIA type II interface). The OOB Signal Good 10 element in the CC 1 provides the logic for signaling a good OOB signal to the host/TV 100 even though the CC does not have an OOB receiver or OOB processor/demodulator to receive information from an OOB Tuner 104 in the device. The CC does not decode the OOB signal and simulates OOB reception (50, 60) using data stored in the CC and data received over the in band channel (102). While the OOB Signal Good processing is shown as a separate box it can also be incorporated into the host interface message processing performed by the processor on the enhanced cable card and a OOB Signal Reception Good message can be sent over the CC to Host Interface using messages instead of a physical signal.

The following processing functions are incorporated either physically or logically (using a software API and/or interfaces between the host and CC) as shown in FIG. 1:

(10). Simulated OOB Recv Signal Good indicator to host—this processing block indicates to the host that the CC is receiving a correct signal and correct data for the host to process CC data. Some host devices will not use the CC if the CC does not indicate data is being received correctly over the OOB channel. This block will also provide other necessary status to the host so that the host continues to operate correctly with the CC (20). OOB Boot Data—data stored in the CC used to allow the card to boot (configure enough host and CC data such that the CC receives the FAT). This is optional data stored in the CC so that the CC contains sufficient data to configure the CC and the host for correct booting (initial connection phase) without OOB data. As previously mentioned there can be multiple configurations stored in the card with one configuration for each network the card is intended to operate on.

(30). Host Interface—Host Interface interfaces the CC with the host. This is typically an interface defined by a standard such as the Cable Labs CC Host Interface specification, the disclosure of which is incorporated by reference herein in its entirety. The CC will send data to the host that in a normal cable system is received over the OOB data channel, that is received by the CC of this invention from sources other than the OOB data channel including but not limited to local data stored in the CC, and the video channel containing the normal programming video and system control video.

(40). Processor—a processor used to coordinate the operation of the CC including interfacing to the host processor. Processor contains control program to simulate to the host the reception and interfacing of data normally received by a CC over the OOB data received from other data sources in the enhanced CC including but not limited to data stored in memory and data received over the normal program video.

(50). Simulated OOB Receiver using in band data. This block receives data normally sent on the OOB channel from the in band video program and interfaces to the host the in band data channel received data as if the data was received from the OOB channel.

(60). In band processor—this block receives the program video signal (or multiple) and extracts out the necessary information normally sent over the OOB from the in band signal.

The OOB spoofing and providing OOB_CC_DATA via flash or the in band data channel does not cause host malfunction in cable networks. Meaning that the host device (TV set) will not know that the CC does not have an Out Of Band data demodulator or OOB processor handling the OOB signal. This is because the steps herein simulate normal cable card operation with an OOB signal without an OOB signal and the host TV is not aware of the processing provided by the CC in accordance with embodiments of the invention.

Conditional Access System (CAS) specific SI data normally delivered over the OOB to the Cable Card is sent over the inband video channel using MPEG private data or an MPEG based EMM channel, or stored in table or both, with table being default and EMM or other in band SI data overwriting preconfigured CC flash data.

An example of the enhanced CC processing is as follows:

1. CC powers on and uses data in CC flash memory containing data normally received over the OOB channel to boot (have the card operate on a cable network) CC boot parameters configure the card to access additional CC data normally sent over the OOB channel from the video stream (in band signal).
2. Inband processor (60) receives in band signal and processes data normally sent using the OOB channel along with other inband data such as program data, carousel data, firmware updates, and other data. Extended in band signal parsing in CC to receive data using in band signal from headend sending data that is normally send over the OOB channel.
3. EMM channel (or private in band data channel) is used to simulate OOB data and SCTE 55, DSG Interface to cable card.
4. When viewed from the host, the CC to host interface operates exactly the same way as if the CC was receiving the OOB signal and complies with the CHI specification.
5. Supports "personality change sequence" as discussed in the CableCARD Interface 2.0 Specification promulgated by Cable Television Laboratories, Inc. of Louisville, Colo.
6. Emergency Alert sent inband using normal inband signaling detected by host
7. Emergency Alert sent over IN_BAND_DATA_CHANNEL instead of OOB channel in addition to normal inband signaling Emergency Alert data.
8. Monitoring IN_BAND_DATA_CHANNEL for changes in data, this is the same data that is normally sent over OOB channel. On detecting OOB data changes in data sent over IN_BAND_DATA_CHANNEL updating CC or host data or both with updated data.

While the above description uses North American Advanced Television System Committee (ATSC) nomenclature, the invention is applicable to other cable systems including Digital Video Broadcast (DVB) and others.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed:

1. A cable card, comprising:
   an in-band processor configured to receive an in-band signal extracted from a broadcast signal by a host device, where the in-band processor is configured to coordinate processing in the cable card and the broadcast signal further comprises an out-of-band signal that is not received by the in-band processor;
   a memory configured to store out-of-band spoofing data utilized by a control program to spoof a host device to interface with the cable card as if the cable card is processing data received from the out-of-band signal;
   wherein the control program configures the processor to:
      send a signal indicative of reception of an out-of-band signal to a host device electrically connected to the cable card despite not receiving the out-of-band signal; and
      process the out-of-band spoofing data from the memory and provide processed output data to a host device simulating data received from an out-of-band signal.

2. The cable card of claim 1, wherein at least a portion of the out-of-band spoofing data stored in the memory is received from the in-band signal.

3. The cable card of claim 1, wherein at least a portion of the out-of-band spoofing data is pre-stored in non-volatile memory on the cable card prior to spoofing a host device to interface with the cable card as if the cable card is processing data received from an out-of-band signal.

4. The cable card of claim 2, wherein an out-of-band signal comprises a signal received from a Forward Application Transport (FAT) channel in an RF signal transmitted from a cable head-end through a cable broadcasting network.

5. The cable card of claim 1, wherein the out-of-band spoofing data is selected from the group consisting of:
   Conditional Access System (CAS) data;
   System Information (SI)/PSIP data;
   Electronic Program Guide (EPG) data;
   System Time Table (STT) data;
   Master Guide Table (MGT) data;
   Virtual Channel Table (VCT) data;
   Network Information Table (NIT) data;
   Rating Region Table (RTT) data;
   Event Information Table (EIT) data;
   Extended Text Table (ETT) data;
   Directed Channel Change Table (DCCT) data;
   XAIT data;
   OCAP data;
   MHP data; and
   GEM data.

6. The cable card of claim 1, wherein the processor is configured to include a hunt algorithm to configure the host device to search different frequencies for an unencrypted in-band channel from which to obtain out-of-band spoofing data.

* * * * *